Sept. 5, 1967 H. O. CORBETT 3,339,240
APPARATUS FOR LAMINAR INJECTION MOLDING
Filed July 29, 1965 3 Sheets-Sheet 3
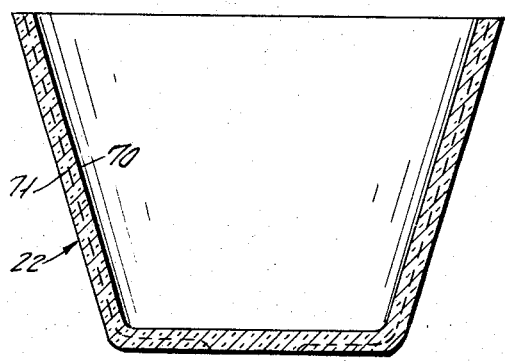
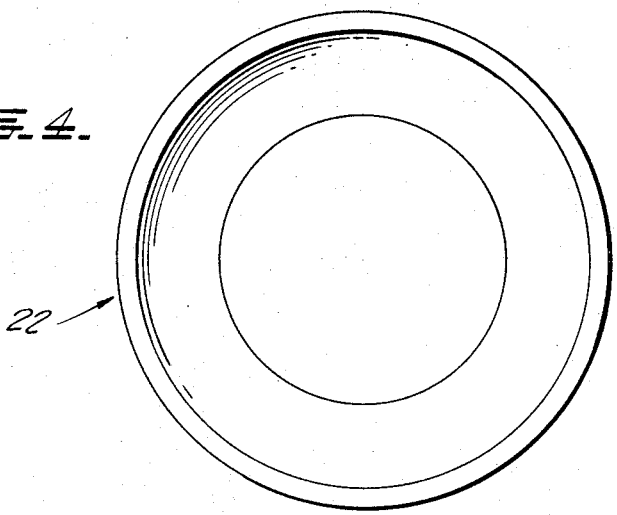
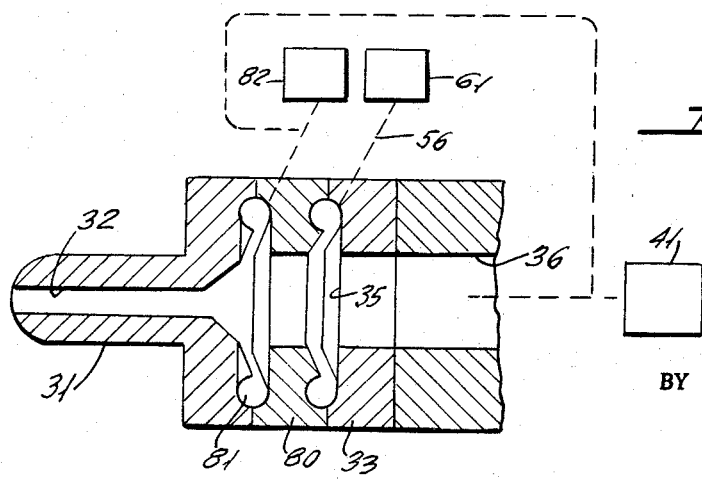
HERBERT O. CORBETT
INVENTOR.
BY Allen L. Meyer United States Patent Office 3,339,240
Patented Sept. 5, 1967

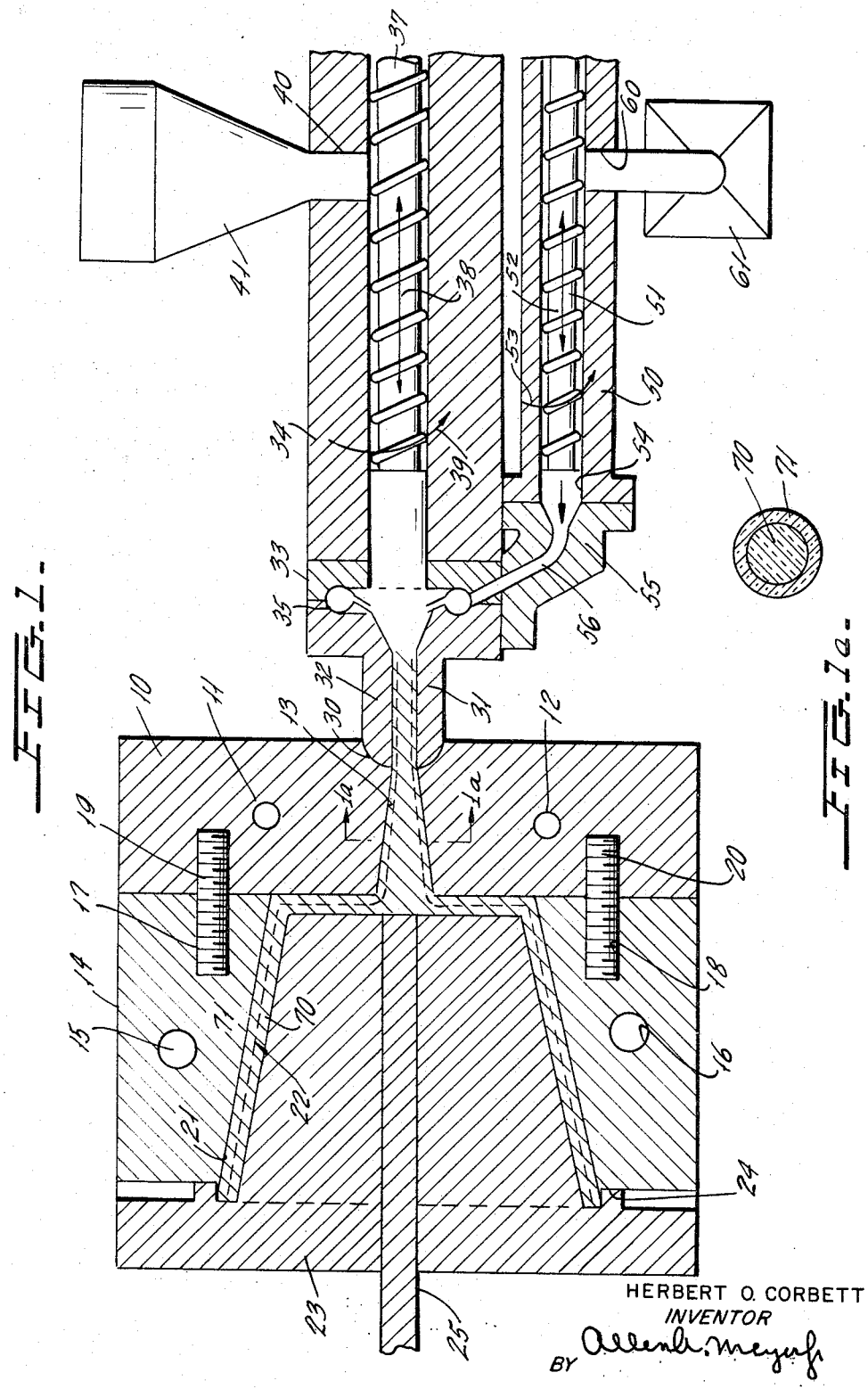

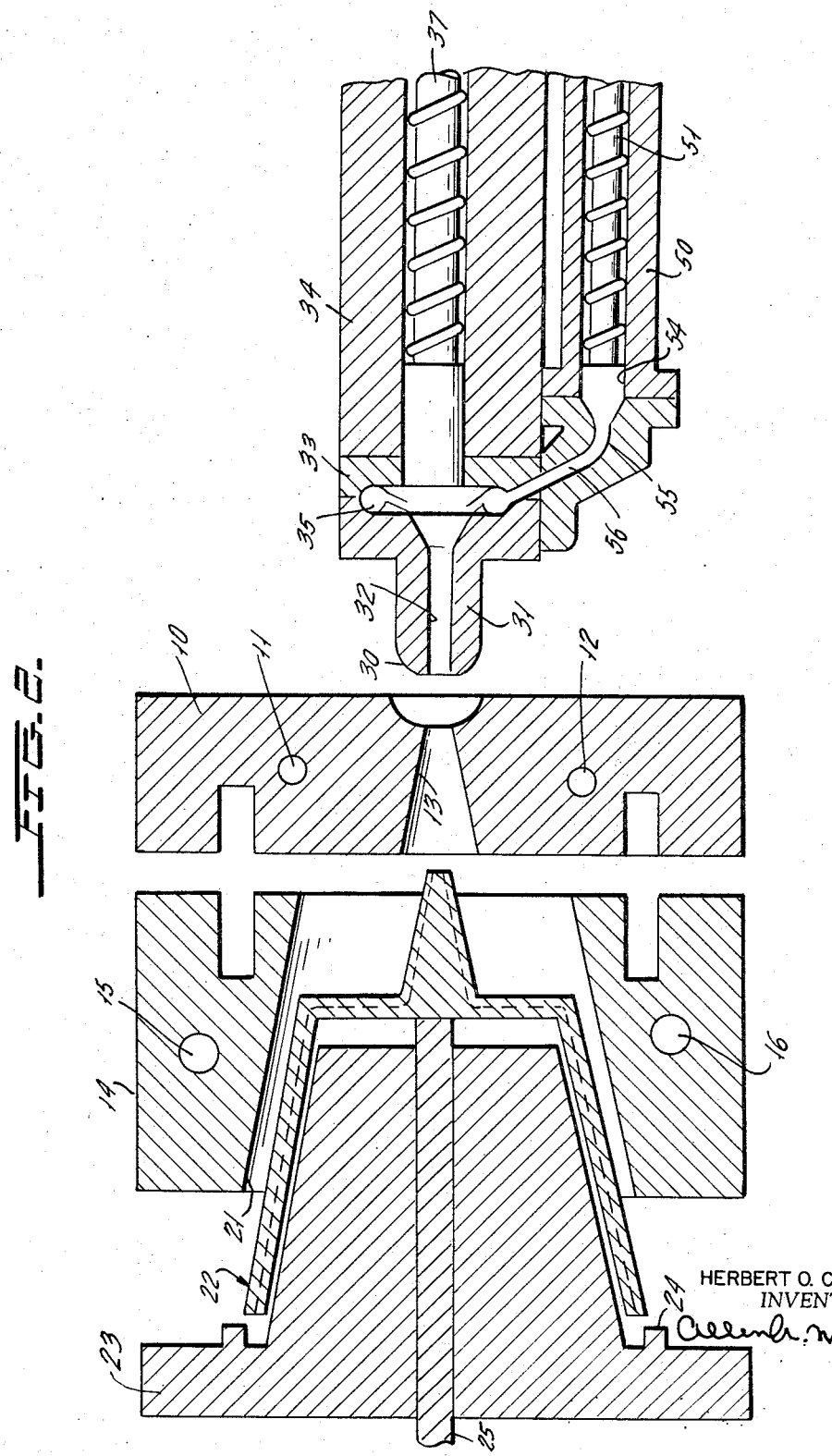

3,339,240
APPARATUS FOR LAMINAR INJECTION MOLDING
Herbert O. Corbett, Bridgeport, Conn., assignor to National Distillers and Chemical Corporation, New York, N.Y., a corporation of Virginia
Filed July 29, 1965, Ser. No. 475,753
4 Claims. (Cl. 18—30)

This invention relates to a novel apparatus for the injection molding of laminated products, and is a continuation-in-part application of my copending application Ser. No. 350,220, filed Mar. 9, 1964.

In accordance with the present invention, a plurality of plastic materials are laminarly combined, and are caused to flow laminarly into an injection mold resulting in a multi-layer finished plastic part. More specifically, and as set forth in my above noted copending application Ser. No. 350,220, it has been discovered that a plurality of plastic sources can be channeled in such a manner as to cause their molten product to flow in a laminar manner while in the molten state, whereupon after the formation of the molten product to a predetermined shape, the plastic will solidify without the mixture of the various plastic layers, thus forming a solidified plastic having discrete layers of different composition with the layers being intimately bonded to one another.

The present invention involves the application of the novel laminar flow principle of the foregoing application specifically to injection molding techniques. That is to say, it has been found that a laminar flow process can be extended to the relatively thick and solid plastic sections normally formed by injection molding techniques as well as to thin film or plastic sheets emphasized in the foregoing application.

The application of the novel laminar flow technique to injection molding, therefore, permits the selection of various plastic materials in various combinations which are chosen for specific physical or chemical properties desired in the injection molded products.

In illustrating the invention, applicant has chosen to illustrate the formation of a simple cup, although it will be apparent to those skilled in the art that many different shapes can be formed in accordance with the invention.

In the formation of the cup, however, and to illustrate the simplicity of selecting various chemical and physical properties for various portions of the cup, the interior section of the cup is formed of foamed polystyrene which has a relatively high softening temperature so that the cup can contain hot liquid. The exterior layer of the cup may then be formed of a high-impact polystyrene which is ideal for physical strength characteristics for the cup and provides a hard polished outer surface, although it would not be useful as the cup interior material, since its softening temperature is of the order of 240° F.

Thus, the combination of the foamed polystyrene and high impact polypropylene in the manner indicated above provides a combined molded cup which is ideal as a drinking cup for hot liquid.

It will be readily apparent that there are a multitude of possible combinations of various materials for various products wherein the specific combinations would be dictated on the basis of material cost, specific chemical resistance, physical strength and any other dictates of the design of the end product composition.

Accordingly, the object of this invention is to provide a novel apparatus for laminar injection molding.

FIGURE 1 illustrates a cross-sectional view of the injection molding apparatus of the invention when in its injection mode of operation.

FIGURE 1a is a cross-sectional view taken across the lines 1a—1a in FIGURE 1 to illustrate the laminar composition of the molten material entering the injection mold.

FIGURE 2 illustrates the injection molding apparatus of FIGURE 1 after the injection operation and with the mold released for removal of the product formed.

FIGURE 3 is a side cross-sectional view of the cup product formed by the injection molding apparatus of FIGURES 1 and 2.

FIGURE 4 is a top view of the cup of FIGURE 3.

FIGURE 5 illustrates, in cross-section, the manner in which the extrusion die can be modified to form three or more layers in the finished product.

Referring first to FIGURES 1 and 2, I have illustrated therein a typical injection mold which is well known to those skilled in the art in combination with a plastic injection structure constructed in accordance with the invention, whereby a laminar molten plastic stream of plastics having diverse chemical or physical properties laminarly flows into the mold.

Referring first to the well known mold structure, there is provided a mold block 10 which has cooling channels 11 and 12 therein in the usual manner, and a sprue 13 through which the molding compound enters from the plastic source of the invention.

A mold cavity 14, which may also have cooling channels 15 and 16 therein, then has openings 17 and 18 which receive guide pins 19 and 20, respectively, which are secured within mold block 10. The mold cavity 14 then has a conical opening 21 therein for defining the exterior shape of the cup product 22 (FIGURES 3 and 4) which is to be formed in the mold. Clearly, the mold cavity would have whatever shape is to be imparted to the exterior of the product formed.

The mold cavity 14 then receives a mold plug 23 which has an extending core section having the shape of the interior of the product to be formed which, in the case of the cup-shaped product, would have the conical interior shape of the cup. Note that annular surface section 24 on the mold plug 23 is spaced from the surface of mold cavity 14 to define a fixed annular chamber having the shape of the product 22 which is to be molded.

The mold plug 23 then has a central channel therein which passes a suitable ejector rod 25. Note that any suitable ejection mechanism can be used where, for example, the ejector rod is connected first to an ejector plate which has a sprue lock pin and ejector pins extending therefrom.

The mold block 10 then has a semi-circular depression 30 in communication with the sprue 13 which receives the injection nozzle 31 of the plastic injection equipment of the invention.

The nozzle 31 has a passage 32 therein which communicates directly with sprue 13, and is directly secured in any desired manner to the orifice block 33 which is, in turn, connected to the pre-plasticizer screw plunger housing 34. The right-hand end of the injection nozzle 32 then has an annular channel 35 formed therein which communicates with the exterior surface of channel 36 extending through housing 34. A similar annular channel in block 33 completes the annular channel communicating with opening 36.

The opening 36 then carries the usual and well known type of pre-plasticizer screw plunger 37 which is movable in either direction indicated by double-ended arrow 38, and is rotatable, as illustrated by arrow 39. The screw 37 then communicates with channel 40 extending from supply hopper 41 of pellets of a suitable plastic material. Thus, the pellets from hopper 41 are caused to move to the left in channel 36 by the rotating action of screw 37. During this time, these pellets are subjected to high pressure and high temperature, whereby the pellets are plasticized and will flow as a molten plastic.

In the cup embodiment example of the invention, the plastic material of hopper 41 will be high-impact polystyrene since it will define the exterior surface of the cup.

It is specifically noted that the injection molding equipment described to this point is old and well known to those skilled in the art. That is to say, the screw-type preplasticizer is exteremely old and well known.

In accordance with the invention, however, a second pre-plasticizer is provided which supplies a second plastic material which laminarly joins with the plastic material flowing in channel 36 so that there is a laminar flow of material through the injection nozzle 31 which continues to laminarly flow into the mold.

This second pre-plasticizer is illustrated in FIGURES 1 and 2 as including the pre-plasticizer screw body 50 which contains a pre-plasticizer screw plunger 51 which is movable in the direction of the double-ended arrow 52, and is rotatable in the direction of arrow 53. The screw 51 is carried in the central channel 54 of body 50 which is suitably connected through an adapter body 55 having a connecting channel 56 therein to the orifice 35. Thus, there is a sealed connection formed from orifice 35 to channel 54.

The housing 50 then has a channel 60 therein which is connected to a second hopper 61 which contains solid plastic pellets of a plastic material having diverse properties from the plastic material of hopper 41. Thus, in the particular example used for illustrating the present invention, hopper 61 will supply foamed polystyrene. Thus, polystyrene particles are plasticized by the rotating action of screw 51 with the plastic material being carried to the left along channel 54 through channel 56 into orifice 35.

In operation, and once a sufficient charge of plastic material fills channels 36, 54, 46, orifice 35 and orifice 32, and this plastic material is suitably fluid by virtue of temperature and pressure existent in the injection apparatus, each of plungers 37 and 51 are driven to the left, thereby driving their plastic material through channel 32, sprue 13 and into the cup-shaped opening defined between mold sections 14 and 23.

The plastic material form channel 54 and, thus, annular orifice 35 will laminarly coat the plastic material coming from channel 36, these materials being laminarly joined before they leave the end of nozzle 31. That is to say, the materials are laminarly joined within their injection nozzle.

These materials have been found to laminarly join one another without mixing so that while in the molten state and in the sprue 13, as shown in FIGURE 1a, the molten stream will have a central portion 70 formed of the molten material from hopper 41 surrounded by an outer layer 71 formed of the molten material from hopper 61.

The laminar nature of the material passing through sprue 13 retains its integrity as it flows into the region between the mold cavity 14 and the mold plug 23, whereupon the exterior of the cup is formed of the material 71 from hopper 41, while the interior of the cup 70 is formed of the material from hopper 61.

Once this injection molding has been completed and the plastic has solidified, the apparatus is opened to the position of FIGURE 2 and the molded cup 22 is withdrawn. The material from the sprue channel is, of course, removed in any suitable manner.

The separation between layers 70 and 71 is illustrated in the figures by a dotted line, it being noted, however, that the bonding between these diverse materials is an extremely intimtae bonding in view of the laminated flow of products. Moreover, and even though the outer layer must flow at a speed different from the inner layer, the novel laminar flow concept defines a substantially zero frictional force between these layers during flow in the plastic state so that, along with the avoidance of turbulence in the flow of the plastic, the layers are able to shift with respect to one another prior to solidification, thus accommodating the different flow rates required for the different layers.

As previously indicated, the completed cup shown in FIGURES 3 and 4 is now formed of two layers 70 and 71, where the inner layer is, for example, polypropylene which has high temperature-withstanding ability, while the outer layer 71 is of polystyrene which has high physical impact resistance. Moreover, the layers 70 and 71 can be of diverse color, due to the addition of suitable coloring medium to the materials in the hoppers 41 and 61, respectively. Clearly, any combination of physical properties could be selected for the article to be molded by the proper selection of suitable plastic materials.

While FIGURES 1 and 2 illustrate the invention for the formation of two layers, it has been found that an article formed of a plurality of layers could also be formed. By way of example, an additional annular channel spaced from channel 35 could be located within the injection nozzle 31 which is connected to a third pre-plasticizer screw plunger arrangement and thus can supply a still further plastic layer in the laminated flow going to the mold. Alternatively, this additional annular channel could be connected to a by-pass channel extending from channel 36 so that the resultant plastic flow would include an inner and outer layer of the material of hopper 41 and an intermediate layer of the material of hopper 60.

A typical die for forming more than two layers is shown in FIGURE 5 where components similar to those of FIGURES 1 and 2 are given similar identifying numerals. Thus, FIGURE 5 differs from FIGURES 1 and 2 in that an added plate 80 is interposed between plate 33 and nozzle 31 to define a second annular orifice 81 in addition to annular orifice 35. The annular orifice 81 is then suitably connected to a third pre-plasticizer screw plunger system fed from a third hopper, which is schematically indicated by block 82, and could be identical to the arrangement of FIGURES 1 and 2 for feeding orifice 35. Thus, the arrangement of FIGURE 5 will define a three-layer plastic stream output from orifice 32, resulting in a three-layer product.

Note that where the inner and outer layer may be of the same material as that of hopper 41, an auxiliary flow channel 83, shown in dotted lines, can branch off from channel 36 and connect into orifice 81.

Although this invention has been described with respect to its preferred embodiments, it should be understood that many variations and modifications will now be obvious to those skilled in the art, and it is preferred, therefore, that the scope of the invention be limited not by the specific disclosure herein but only by the appended claims.

What is claimed is:

1. Injection molding apparatus for forming laminated plastic products; said apparatus including a mold having a separable mold core defining therewith a mold cavity and a sprue channel leading to said cavity; plastic injection apparatus including a nozzle engageable with said sprue channel, said nozzle being provided with a passage extending therethrough with the outer extremity of said passage in direct communication with said sprue channel; said plastic injection apparatus being provided with a first combined plasticizer-plunger means for injecting plastic material directly into the inner extremity of the passage in said nozzle; said nozzle being provided with an interior annular channel located in completely surrounding relationship with respect to said nozzle passage; said plastic injection apparatus being provided with a second combined plasticizer-plunger means and a channel providing direct communication from said second combined plasticizer-plunger means and the annular channel in said nozzle whereby plastic material from said second plasticizer-plunger means will be received within said nozzle in surrounding relationship with respect to the plastic material entering said nozzle from said first combined plasticizer-plunger means; the construction and arrangement being such that the plastic material from said second combined plasticizer-plunger means will laminarly coat the plastic material from said first combined plasticizer-plunger means and will pass through said nozzle passage into said sprue channel and mold cavity as a laminated product.

2. The apparatus substantially as set forth in claim 1 wherein said first and second plastic feed means are loaded with plastics of a diverse composition.

3. Injection molding apparatus as set forth in claim 2 wherein the plastic material from said first combined plasticizer-plunger is polypropylene and the plastic material from said second combined plasticizer-plunger is high-impact polystyrene.

4. Injection molding apparatus as set forth in claim 1 which further includes a third combined plasticizer-plunger means, said nozzle is provided with a second interior annular channel surrounding the nozzle passage, and said plastic injection apparatus is provided with a channel connecting said third combined plasticizer-plunger means with said second annular channel whereby a laminated product having more than two layers of plastic material is produced.

References Cited
UNITED STATES PATENTS

| | | | |
|---|---|---|---|
| 2,418,856 | 4/1946 | Stacy | 264—241 X |
| 2,456,141 | 12/1948 | Myerson | 18—13 |
| 2,848,747 | 8/1958 | Dixon | 18—13 X |
| 3,189,941 | 6/1965 | Reifenhauser | 18—13 |

J. SPENCER OVERHOLSER, *Primary Examiner.*

WILBUR L. McBAY, *Assistant Examiner.*

UNITED STATES PATENT OFFICE
CERTIFICATE OF CORRECTION

Patent No. 3,339,240 September 5, 1967

Herbert O. Corbett

It is certified that error appears in the above identified patent and that said Letters Patent are hereby corrected as shown below:

Column 3, line 2, "high-impact" should read -- foamed --; line 3, "exterior" should read -- interior --; line 29, "foamed" should read -- high-impact --; line 56, "41" should read -- 61 --; line 57, "61" should read -- 41 --.

Signed and sealed this 23rd day of December 1969.

(SEAL)
Attest:

Edward M. Fletcher, Jr.  WILLIAM E. SCHUYLER, JR.
Attesting Officer  Commissioner of Patents